UNITED STATES PATENT OFFICE.

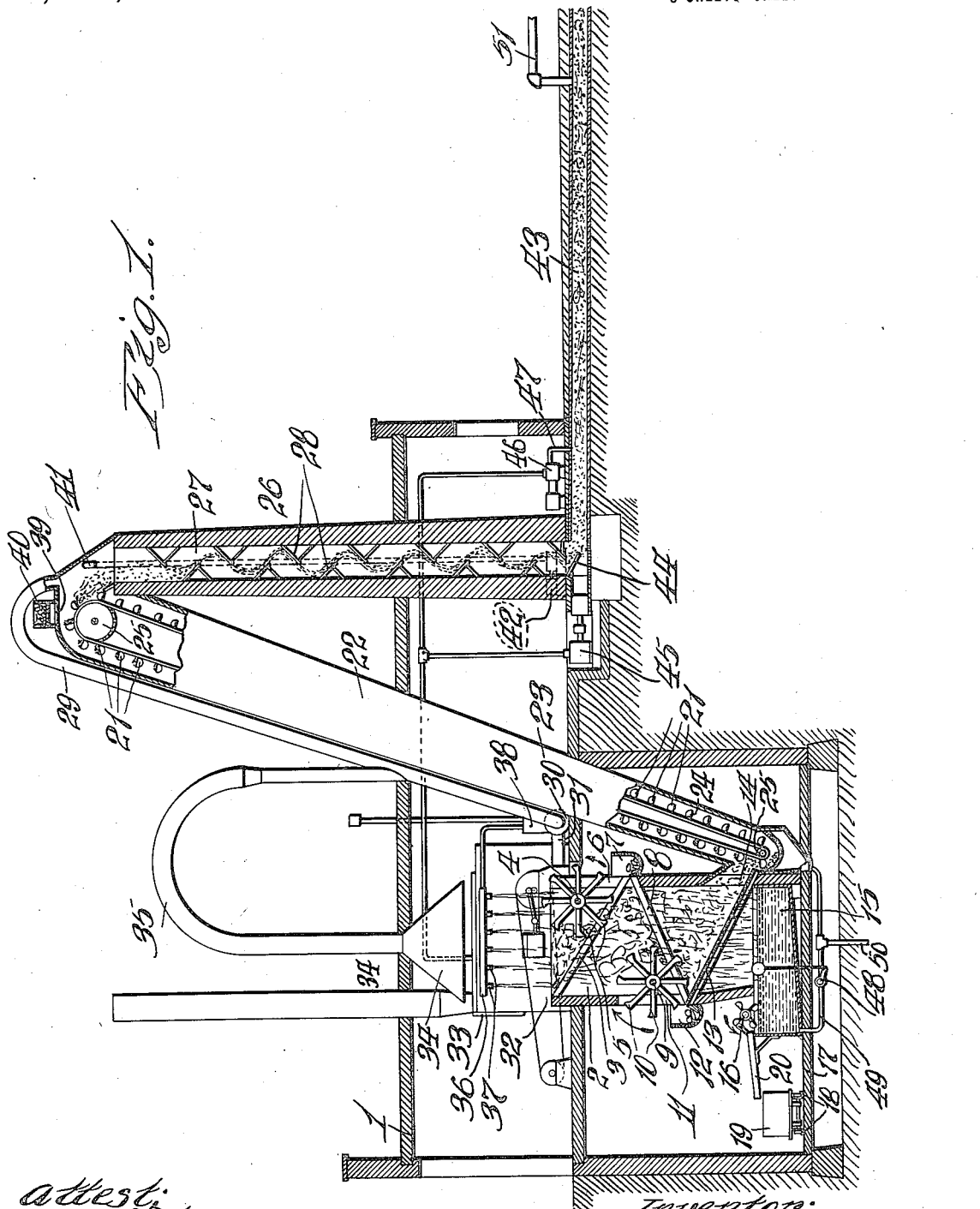

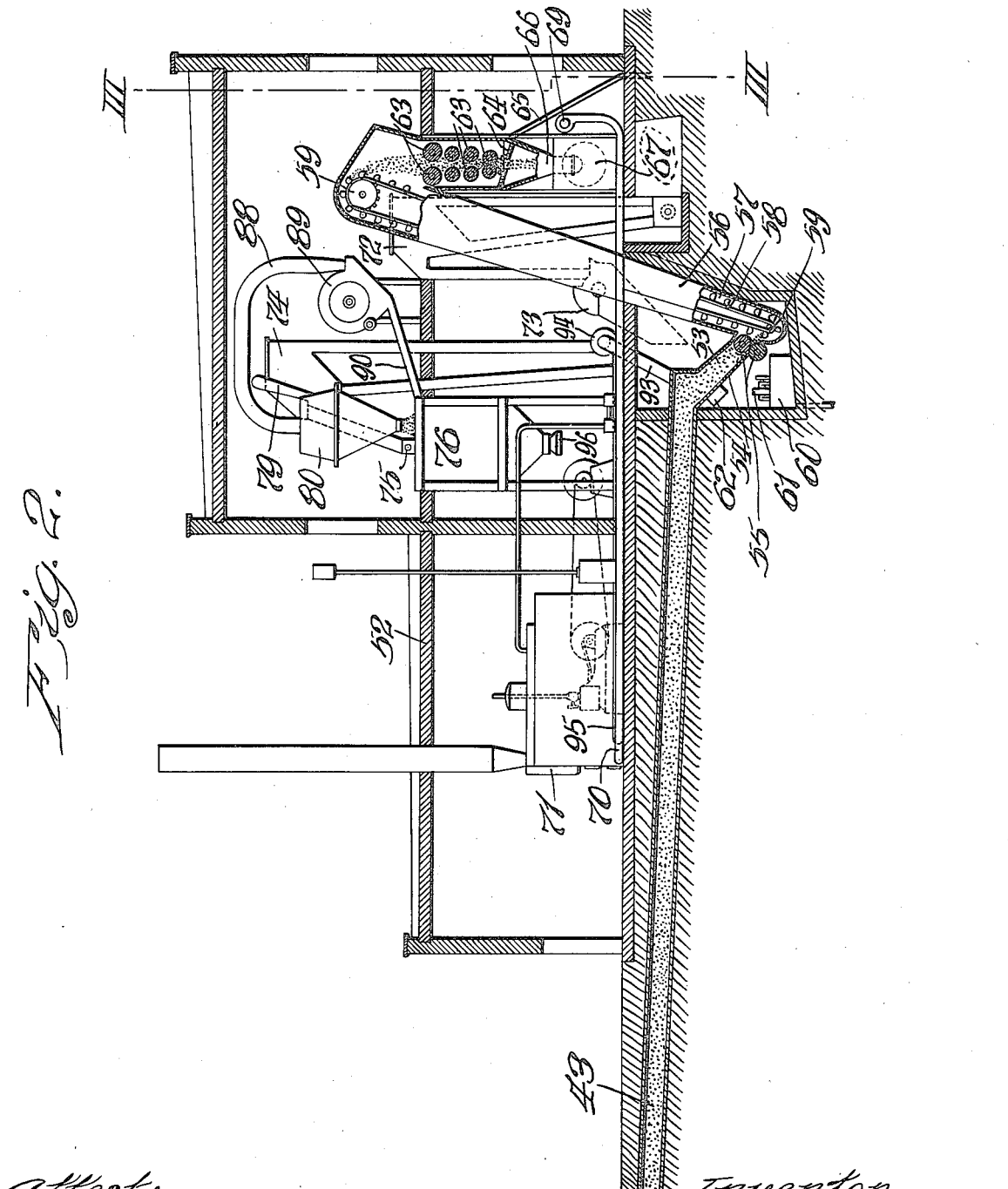

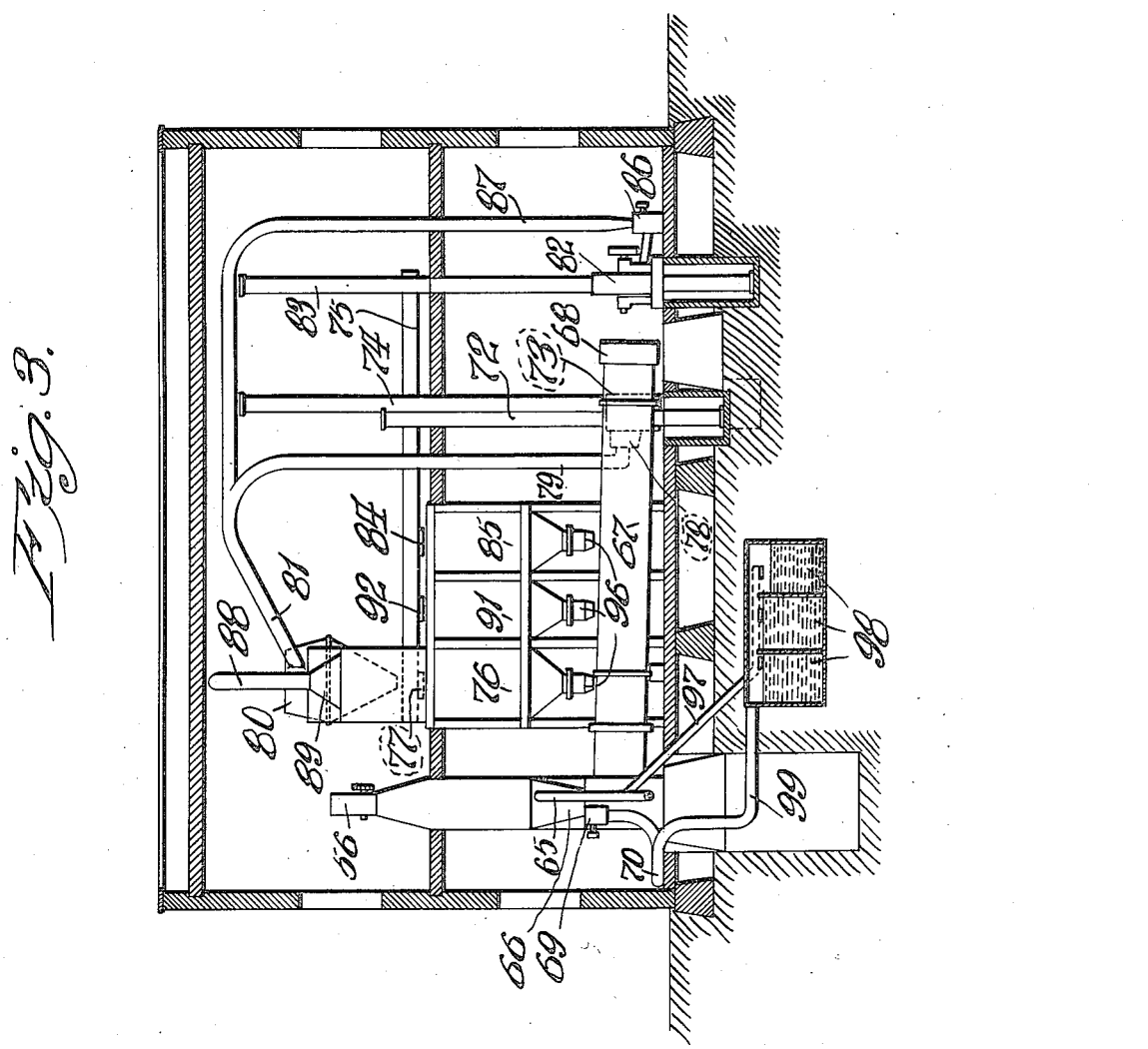

HENRY FREDERICK WILLIAM BROCKHAUSEN, OF ST. LOUIS, MISSOURI.

GARBAGE REDUCTION AND TRANSPORTATION SYSTEM.

1,210,408. Specification of Letters Patent. Patented Jan. 2, 1917.

Application filed April 4, 1914. Serial No. 829,499.

*To all whom it may concern:*

Be it known that I, HENRY FREDERICK WILLIAM BROCKHAUSEN, a citizen of the United States of America, and a resident of the city of St. Louis and State of Missouri, have invented certain new and useful Improvements in Garbage Reduction and Transportation Systems, of which the following is a specification.

The primary object of this invention is to provide an improved reduction system for garbage in which no further handling of the garbage is required after it has been received in the receiving hopper at the garbage plant until it is converted into a fertilizer.

Another object is to provide an improved garbage system which is absolutely sanitary and which disposes of all obnoxious gases.

A further object is to provide improved means for washing and cleaning the garbage.

A still further object is to provide an improved manner of transporting the garbage from the garbage plant to a fertilizer plant.

Other and further objects will appear in the specification, and be specifically pointed out in the appended claims, reference being had to the accompanying drawings exemplifying the invention, and in which, Figure 1 is a vertical section taken through this improved garbage receiving plant. Fig. 2 is a vertical section taken through the fertilizer plant. Fig. 3 is a section taken approximately on the line III—III, Fig. 2.

Referring to Fig. 1 of the drawings: 1 designates the garbage receiving plant. Extending above the floor line of the plant is an open-ended receiving hopper 2. Located in said hopper are a series of spaced apart inclined bars 3. Arranged above said bars is a horizontal shaft 4. Securely mounted to said shaft are a series of feeding or mashing arms 5, said arms being adapted to travel between the bars 3. Formed on one side of said hopper 2 is an opening 6, said opening extending downwardly to the lower inclined end of the bars 3. Located adjacent the lower end of said bars is a horizontally arranged hopper 7. Mounted in the hopper 2 beneath the inclined bars 3 is another set of inclined bars 8, said bars being spaced apart and inclined in a direction opposite to said bars 3. Horizontally mounted above said bars 8 is a shaft 9, said shaft having secured thereto a series of mashing arms 10.

Formed in the wall of the hopper 2, adjacent the lower end of the bars 8, is an opening 11. Located adjacent the lower end of said opening is a hopper 12. Located in said hopper 2, beneath the inclined bars 8, is an inclined perforated bottom 13. Formed in one of the walls of said hopper, at the lower end of said inclined bottom, is a discharge opening 14. Located beneath said inclined bottom 13 is a drip pan 15. Mounted above said drip pan at one end thereof is a grease scalper 16. The drip pan 15 rests on the floor 17. Located on said floor are trackways 18, said trackways being for the operation of a portable grease tank 19, said tank adapted to be in communication with the scalper 16 by means of an inclined trough 20.

Communicating with the discharge opening 14 of the hopper 2 is an elevator 22, said elevator comprising a housing 23 and a chain bucket conveyer 24, said conveyer being operably mounted on sprockets 25. This elevator 22 leads up to a tower 26, said tower having a shaft 27 formed therein, with a series of inclined baffle plates 28 arranged on opposing walls thereof. The housing 23 of the elevator 22 is arranged at the upper end thereof so as to form a closure for the shaft 27 of the tower 26. Leading from the housing 23 at a point above the tower is a foul air pipe 29, said pipe leading downwardly alongside of the elevator to a suction fan 30. Connected to the suction fan 30 is a discharge pipe 31 which leads to the furnace 32 of the boiler 33. Suspended above the opening of the hopper 2 is an inverted funnel 34. Communicating with the top of said funnel is a foul air intake pipe 35 which connects with the foul air pipe 29.

Mounted above the opening of the hopper 2 is a hot water coil 36 having a plurality of depending jets 37, said hot water coil having communication with a water heater 38. Formed in the top of the housing 23 above the elevator 22 is an opening 39. Located above said opening is a fire grate 40. Leading to the top of the shaft 27 of the tower 26 is a water pipe 41, said pipe adapted to discharge water into the shaft 27 from the pump 42. Communicating with the bottom of the shaft 27 is a conduit 43. Adapted to intermittently close communication between said shaft and said conduit is a clapper valve 44. Mounted at one end of said conduit is a force pump 45. Located adjacent the bottom of the tower 26 is an air compressor 46, said air compressor having a discharge pipe 47 which communicates with the conduit 43. The conduit is preferably on an incline, and leads to a fertilizer plant, which will be hereinafter described.

In the operation of the garbage plant just described, the operating parts thereof being in motion, collected garbage is dumped into the hopper 2, and is treated by the hot water discharged from the nozzles 37 of the hot water coil 36. The garbage thus dumped rests upon the inclined bars 3, and is agitated and broken up and mashed between the bars 3 by the revolving mashing arms 5 which are mounted on the horizontal shaft 4. If obstructions, such as bones, pieces of metal, and the like, are encountered by the mashing arms, they will be slid down the inclined bars 3 between the mashing arms and will be received by the hopper 7. The garbage, after passing between the bars 3, will be arrested by the spaced inclined bars 8 and will be acted upon and further mashed by the mashing arms 10 which are mounted on the shaft 9. If any objectionable material, such as bones, passes through the bars 3, it will be acted upon by the mashing arms 10 and thrown into the hopper 12 which is located adjacent the opening 11 of the hopper 2. As the garbage is mashed through the bars 8, it will fall upon the inclined perforated bottom 13 and will travel downwardly through the discharge opening 14 into the bottom of the elevator 22. Treating the garbage with water that is extremely hot while the garbage is being broken up by the mashing arms 5 and 10 will cause a greater per cent. of grease to be removed from said garbage. The hot water and grease will pass through the perforated bottom 13 of the hopper 2, and will be received by the drip pan 15. The grease, which is then in an oily state, will float on top of the water contained in the drip pan. The grease scalper 16, being in operation, will remove the grease and elevate it to the inclined discharge trough 20. The grease will be then discharged into the grease tank 19. When the water in the drip pan 15 reaches a predetermined height, the float operated valve 48 will be opened, and water will be discharged from the tank through the drain pipe 49 to a sewer (not shown) through the branch pipe 50. As the mashed garbage is discharged through the opening 14 into the elevator 22, it will be received by the buckets 21 of the conveyer 24, and be carried up to the top of the tower 26 and dumped into the shaft 27 of said tower. As the mashed garbage falls down the shaft 27, it will be engaged by the baffle plates 28 which will throw it from side to side, thereby tumbling the garbage and loosening and cleaning it. At the same time, the garbage will be mingled with water from the water pipe 41, which discharges water into the top of the shaft 27. As the garbage reaches the bottom of the shaft 27, it will be received by the conduit 43, and will have a tendency to flow through the conduit as said conduit is constructed on an incline. To make the flow of the garbage through the conduit 43 more positive, the force pump 45, which is located at the receiving end of the conduit, will act upon the garbage and force it through the conduit. In order to prevent the garbage from being forced back up the shaft 27 of the tower 26, the clapper valve 44 is arranged to work in combination with the force pump 45. The clapper valve will intermittently close the lower end of the shaft 27. To further assist the forcing of the garbage through the conduit 43, the air compressor 46 is adapted to force air into said conduit through the discharge pipe 47.

In order to remove gases from the garbage contained in the conduit, a gas outlet 51 is connected with the conduit, and the gas discharged therefrom may be utilized for various purposes. In order to remove the stench or obnoxious odors from the garbage, the odors, upon arising from the hopper 2, will be drawn into the inverted funnel 34, thence into the intake pipe 35, and through the pipe 29, by the suction fan 30, and will be discharged into the discharge pipe 31, and then into the furnace 32. The odors arising from the elevator 22 and tower shaft 27 will be drawn into the pipe 29, and will also be discharged into the furnace 32 by way of the suction fan 30 and discharge pipe 31. If for any reason the suction fan 30 is out of order so that foul gases cannot be removed from the housing 23 of the elevator 22, a charcoal fire is built in the fire grate 40. As the gases pass through the opening 39 to the fire in said grate, they will be consumed.

In the fertilizer plant 52, which is adapted to be in coöperation with the garbage plant 1, just described, the conduit 43 has a discharge end 53 which is located in the fertilizer plant. The discharge end 53 has a perforated bottom 54. Located adjacent said discharge end is a pair of squeezing rollers 55. As the garbage is forced through the conduit 43 and is received by the discharge end 53, it is fed through the squeezing rollers 55 and into the lower end of the housing 56 of the elevator 57. Said elevator comprises a chain bucket conveyer 58 which is mounted on sprockets 59. The liquid that is mingled with the garbage at the discharge end 53 will fall through the perforations of the bottom 54 into a drip pan 60, and the grease that is contained in the liquid, when received by the drip pan, will be removed therefrom by the scalper 61. If desired, a heating device 62 may be located adjacent the discharge end 53 of the conduit so as to heat the garbage in order to reduce the grease that is contained in the garbage to an oily state so that a greater per cent. of grease can be taken from the garbage. The garbage, upon passing between the squeezing rollers 55, is received by the buckets of the conveyer 58, and after being elevated to the top of the elevator 57, is discharged between a series of graduated heated pressing rollers 63. Located beneath said rollers, is a drip pan 64, which will receive the liquid from the garbage after the latter has been passed between said rollers 63. The liquid will be carried away from the drip pan 64 by the drain pipe 65. The garbage, upon passing through the heating and pressing rollers 63, is somewhat dry, and is discharged through the discharge spout 66 into a combined rotary steam drier and agitator 67. This rotary drier is heated by steam coils which are located in the steam head 68. Air is drawn through the steam heated head 68, and through the rotary drier 67, by the suction fan 69. This suction fan 69 will also discharge all obnoxious odors from the rotary drier into the discharge pipe 70 which leads to the furnace of the boiler 71.

As shown in Fig. 3, the rotary drier 67 is mounted on an incline so the garbage, while being treated in the drier, will travel to the end of the drier adjacent the steam head 68, be discharged therefrom and received by the bucket elevator 72, whereby the garbage is elevated and discharged into a pulverizer 73 where it is pulverized. After the garbage has been worked on by the pulverizer 73, it is discharged into an elevator 74 which conveys the pulverized garbage to a conveyer 75, said conveyer carrying the pulverized garbage to and depositing it in a storage bin 76 through the discharge chute 77. A suction fan 78 is used in connection with an exhaust pipe 79 for the purpose of withdrawing dust from the pulverizer 73 and discharging it into a collector 80 from the discharge end 81 of the pipe 79.

In order to enrich the pulverized garbage, limestone is ground in the pulverizer 82, and is discharged therefrom into an elevator 83, said elevator adapted to discharge the pulverized limestone into the conveyer 75. Said limestone is discharged from said conveyer through the controlled discharge outlet 84 into the storage bin 85. To remove dust from the pulverizer 82, a suction fan 86 is used in connection with the discharge pipe 87, said discharge pipe being in communication with the discharge end 81 of the pipe 79, and the limestone dust will be discharged into the collector 80. The pulverized garbage and limestone dust accumulated in the collector 80 is then discharged into the bin 76. In order to further assist the work of the collector 80, the dust pipe 88 is connected with the top of said collector and leads to another collector 89. Leading from said collector 89 is a discharge pipe 90 which leads to the bin 76. When pulverized garbage is being conveyed from the garbage pulverizer 73 through the conveyer 75, the pulverized limestone elevator 83 will be inoperative. When pulverized limestone is being conveyed from the limestone pulverizer 82 through the conveyer 75 to the bin 85, the elevator 74 will be inoperative. When it is desired to convey a mixed product, the pulverized garbage and limestone, through the conveyer 75 to the mixed bin 91, both pulverizers 73 and 82 with their respective elevators 74 and 83 will be in operation, and the mixed product will be discharged from the conveyer 75 through the controlled discharge outlet 92.

To provide means of getting rid of the foul gases before the garbage from the conduit 43 passes through the squeezing rollers 55, a foul air pipe 93 is located in said conduit adjacent the discharge end 53. Communicating with said pipe 93 is an exhaust fan 94 which will discharge the foul gases into the pipe 95 which leads to the furnace of the boiler 71.

In order to utilize the liquid which is drained from the drip pan 64, a controlled branch pipe 97 is connected with the drain pipe 65. This pipe 97 leads to a series of inclosed settling vats 98. Foul gases are removed from said vats by the suction pipe 99 which leads to the pipe 70. The sediment thus deposited in said tanks, when removed therefrom, can be used as a fertilizer. As the liquid contained in said tanks is derived from the garbage as the garbage is fed through the pressing rolls 63, vegetable acids can be acquired therefrom.

In packing for shipment the pulverized garbage, pulverized limestone, and mixed material, said materials can be withdrawn from their respective bins 76, 85 and 91 through the regulating discharge openings 96.

In installing an improved garbage reduction and transportation system of this character, the garbage plant can be located within the limits of a city, as provision has been made for preventing the escape of obnoxious odors that will arise from the dumping of the garbage into the top of the receiving hopper 2, as well as a further removal of the obnoxious odors from the garbage while it is being treated. A further sanitary precaution is also provided inasmuch as the travel of the garbage through the steps of operation from the receiving hopper to the pulverizers at the fertilizer plant is entirely inclosed.

The installation of the fertilizer plant can be at a considerable distance away from the garbage plant, both of said plants being connected together by the conveyer or underground conduit 43. The garbage, while traveling the length of the conduit, will be in a stage of treatment preparatory to being operated upon at the fertilizer plant.

What I claim is:

1. In a garbage reduction system, a receiving hopper, a hot water discharging device located above said hopper, a washing apparatus located adjacent said hopper, a conveyer for conveying garbage from said hopper to said washing apparatus, and a conduit for receiving garbage from said washing apparatus.

2. In a garbage reduction system, a receiving hopper, a washing apparatus located adjacent said hopper, a conveyer for conveying garbage from said hopper to said washing apparatus, a conduit for receiving the garbage from said washing apparatus, and a garbage mashing device located in said hopper.

3. In a garbage reduction system, a receiving hopper, a hot water discharging device located above said hopper, a washing apparatus located adjacent said hopper, a conveyer for conveying garbage from said hopper to said washing apparatus, a conduit for receiving garbage from said washing apparatus, and a garbage mashing device located in said hopper.

4. In a garbage reduction system, a garbage receiving hopper, a mashing apparatus located in said hopper, an inverted funnel located above said hopper, and means for creating a vacuum in said funnel.

5. In a garbage reduction system, a garbage receiving hopper, a mashing apparatus located in said hopper, an inverted funnel located above said hopper, a hot water discharging device located between said hopper and said funnel, and means for creating a vacuum in said funnel.

6. In a garbage reduction system, a garbage receiving hopper, a mashing apparatus located in said hopper, a washing apparatus located adjacent said hopper, an inverted funnel located above said hopper, a hot water discharging device located between said hopper and said funnel, means for conveying garbage from said hopper to said washing apparatus, and means for creating a vacuum in said funnel.

7. In a garbage reduction system, a garbage receiving hopper, a mashing apparatus located in said hopper, a washing apparatus located adjacent said hopper, an inverted funnel located above said hopper, a hot water discharging device located between said hopper and said funnel, means for conveying garbage from said hopper to said washing apparatus, means for creating a vacuum in said funnel, and a conduit for receiving garbage from said washing apparatus.

8. In a garbage reduction system, a garbage receiving hopper, a mashing apparatus located in said hopper, a perforated bottom for said hopper, a drip pan located beneath said hopper bottom, and a hot water discharging device located above said hopper.

9. In a garbage reduction system, a garbage receiving hopper, a mashing apparatus located in said hopper, a perforated bottom for said hopper, a drip pan located beneath said hopper bottom, a hot water discharging device located above said hopper, an inverted funnel located above said hot water device, and means for creating a vacuum in said funnel.

10. In a garbage reduction system, a garbage receiving hopper, a mashing apparatus located in said hopper, a perforated bottom for said hopper, a drip pan located beneath said hopper bottom, a hot water discharging device located above said hopper, and a conveyer for conveying garbage from said hopper to a combined washing and tumbling apparatus located adjacent said hopper.

11. In a garbage reduction system, a garbage receiving hopper, a mashing apparatus located in said hopper, a perforated bottom for said hopper, a drip pan located beneath said hopper bottom, a hot water discharging device located above said hopper, a conveyer for conveying garbage from said hopper to a combined washing and tumbling apparatus located adjacent said hopper, and a conduit for receiving the garbage after it has passed through said washing apparatus.

12. In a garbage reduction system, a garbage receiving hopper, a mashing apparatus located in said hopper, a perforated bottom for said hopper, a drip pan located beneath said hopper bottom, a hot water discharging device located above said hopper, and a grease scalper operably mounted in said drip pan.

13. In a garbage reduction system, a garbage receiving hopper, a series of inclined bars located in said hopper, a mashing apparatus comprising a series of revolubly mounted arms located in said hopper, said arms adapted to travel between said bars, a perforated bottom located in said hopper, a drip pan located beneath said bottom, and a hot water discharging device located above said hopper.

14. In a garbage reduction system, a garbage receiving hopper, a series of inclined bars located in said hopper, a mashing apparatus comprising a series of revolubly mounted arms located in said hopper, said arms adapted to travel between said bars, a perforated bottom located in said hopper, a drip pan located beneath said bottom, a hot water discharging device located above said hopper, an inverted funnel located above said hot water device, and means for creating a vacuum in said funnel.

15. In a garbage reduction system, a garbage receiving hopper, a series of inclined bars located in said hopper, a mashing apparatus comprising a series of revolubly mounted arms located in said hopper, said arms adapted to travel between said bars, a perforated bottom located in said hopper, a drip pan located beneath said bottom, a hot water discharging device located above said hopper, an inverted funnel located above said hot water device, means for creating a vacuum in said funnel, and an inclosed conveyer adapted to remove the garbage from said hopper, said conveyer having its discharge end in communication with a garbage washing apparatus.

16. In a garbage reduction system, a garbage receiving hopper, a series of inclined bars located in said hopper, a mashing apparatus comprising a series of revolubly mounted arms located in said hopper, said arms adapted to travel between said bars and to force garbage therethrough, a perforated bottom located in said hopper, a drip pan located beneath said bottom adapted to receive drippings from said hopper, a hot water discharging device located above said hopper, and a grease scalper operably mounted in said drip pan.

HENRY FREDERICK WILLIAM BROCKHAUSEN.

In the presence of—
H. G. FLETCHER,
M. C. HAMMON.